United States Patent [19]

Kobayashi et al.

[11] 3,745,541

[45] July 10, 1973

[54] MAGNETIC THIN FILM PLATED WIRE MEMORY

[75] Inventors: Seihin Kobayashi; Michihiro Torii; Takehiko Jojima, all of Shizuoka-ken, Japan

[73] Assignee: Fuji Electrochemical Co., Ltd., Shizuoka-ken, Japan

[22] Filed: Apr. 7, 1972

[21] Appl. No.: 242,076

[52] U.S. Cl. 340/174 PW, 340/174 BC, 340/174 M, 340/174 TF, 340/174 VA

[51] Int. Cl. ........................ G11c 11/04, G11c 11/14

[58] Field of Search .............................. 340/174 JA; 340/174 PW, 174 RC, 174 VA, 174 BC, 174 JA

[56] References Cited

UNITED STATES PATENTS

| | | | |
|---|---|---|---|
| 3,665,428 | 5/1972 | Olyphant, Jr. | 340/174 BC |
| 3,623,037 | 11/1971 | Parks | 340/174 VA |
| 3,500,353 | 3/1970 | Tohma et al. | 340/174 PW |
| 3,448,514 | 6/1969 | Reid et al. | 340/174 VA |

*Primary Examiner*—James W. Moffitt
*Attorney*—Eliot S. Gerber

[57] ABSTRACT

A magnetic thin film plated wire memory comprises a fixed plate having a number of groove or tunnels intersecting at right angles substantially with a number of embedded word wires whose surfaces are exposed at the intersecting points with said grooves or tunnels, and a number of digit wires arranged in the said grooves or tunnels, said digit wire being a magnetic thinfilm plated wire and a non-magnetic conductive wire.

10 Claims, 5 Drawing Figures

MAGNETIC THIN FILM PLATED WIRE MEMORY

Figures 1, 2, 3, 4, 5:
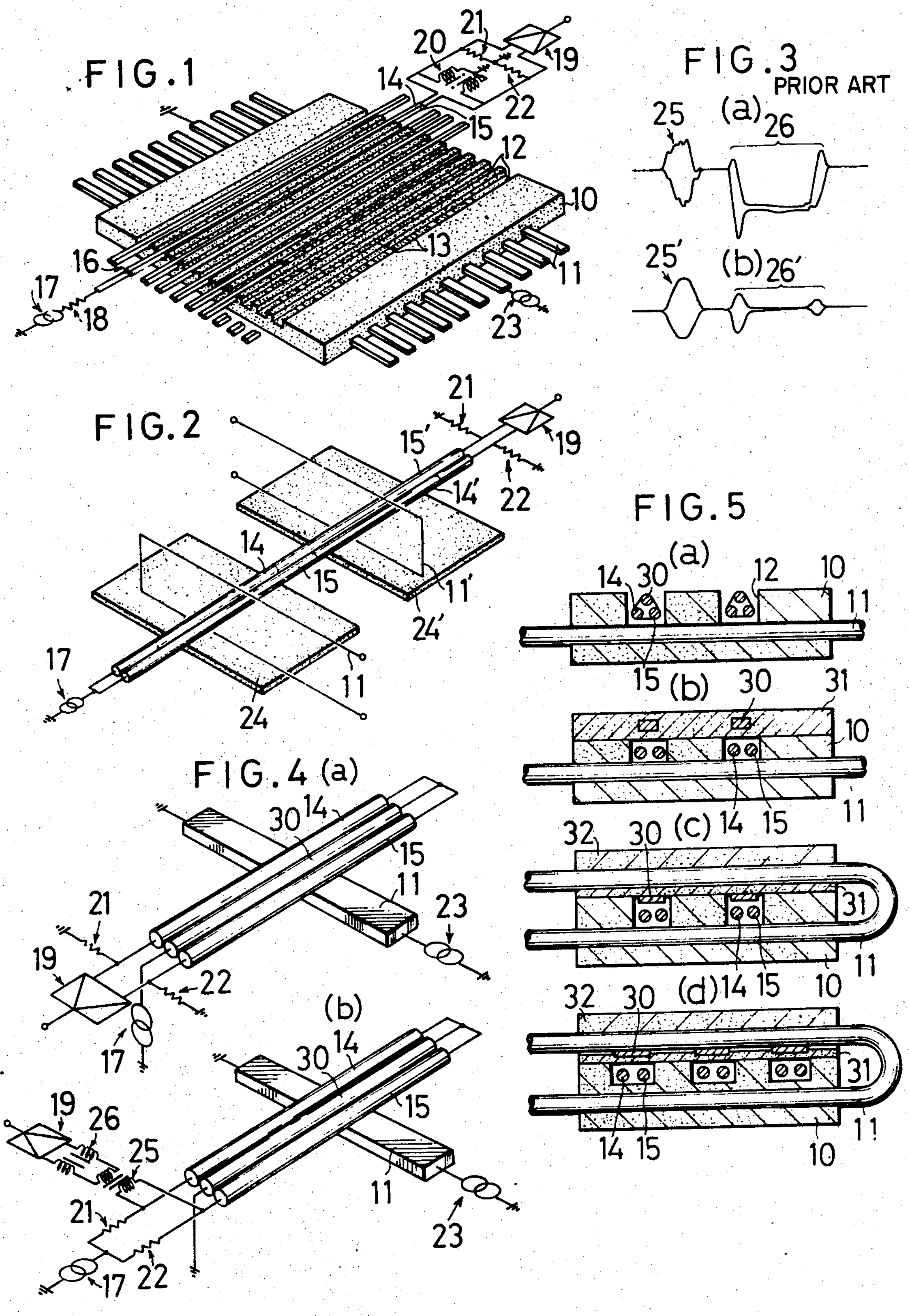
FIG. 1, FIG. 2, FIG. 3 PRIOR ART, FIG. 4, FIG. 5

This invention relates to a magnetic thin film plated wire memory having a number of digit wires and word wires intersected each other at right angles upon a fixed plate, each of said digit wires comprising a magnetic thin film plated wire having a thin film plated upon a conductive wire and a dummy wire consisting of a non-magnetic conductive wire.

In a known magnetic thin film plated wire memory, a number of plated conductive wires and non-magnetic conductive wires are alternately provided at an equal interval from each other. Each pair of the plated conductive wires and non-magnetic conductive wires are connected with a sense amplifier respectively, the other end of the plated conductive wire and non-magnetic conductive wire being connected with a bit driver in order that information write-in current leads back through the plated conductive wire and non-magnetic conductive wire, or that the current flows through the plated conductive wire and non-magnetic conductive wire. Each of the word wires, intersected at right angles with a number of the plated conductive wires and non-magnetic conductive wires, is connected with a respectively driver. driver In connecting digit wires in adjacent memories, magnetic plated wires in one memory are connected with magnetic plated wires in another adjacent memory and non-magnetic conductive wires in the adjacent both memories are connected with each other.

In such a magnetic thin film plated wire memory, write-in and read-out are operated in a word selection system so that information write-in may be operated by a reverse of circumferential or axial direction of magnetization at the intersecting point of the word wire end the digit wire.

When information write-in current from the digit driver is equally divided into a plated wire and a non-magnetic conductive wire and is grounded by way of an transformer, common mode noise or digit noise caused by information write-in current induced to two input terminals of a sense amplifier becomes nearly equal to each other at the two terminals. Therefore, by application of a differential sense amplifier as a sense amplifier, said noise cancels each other. As a capacitance noise, caused by electro-magnetic capacitance, between the word wire and the plated wire, at the time of information write-in is induced equally to the non-magnetic conductive wire or the dummy wire, the capacitance noise can be cancelled by a sense amplifier (like the digit noise described above), and only an output voltage induced from the intersecting point is selected and amplified.

However, an actual electrical balance between the dummy wire and the plated wire still has some defects, and cancellations of capacitance noise and of digit noise have hardly been attained respectively.

More than that, in the conventional magnetic thin film plated wire memory as described above, the packing density of the memory elements has been limited. Further, as the information write-in current is an outgoing current which is distributed in a parallel form to the plated wire and to the non-magnetic conductive wire, an image current of the information write-in current is induced to an adjacent ground plate, which causes rather high impedance of driving wires due to the interposed magnetic keeper and leads to a high driving voltage, especially in a large capacity memory device, and to a large amount of loss time and delay time.

In addition, as the information write-in current distributed in parallel is twice as much as the electric current supplied to the magnetic wire, the scope of external magnetic field generated around the information wire is relatively wide, which causes to the interaction of the magnetic field between the information wires, thereby disturbing the information already written in.

An object of the present invention is therefore to provide a magnetic thin film plated wire memory in which packing density of memory elements can be higher with less interaction between adjacent memory elements and much less noise.

Another object of the present invention is to provide a magnetic thin film plated wire memory as defined above, wherein driving impedance is kept low so it is applicable to a large capacity memory device.

Still another object of the present invention is to provide a magnetic thin film plated wire memory as defined above, wherein both capacitance noise and digit noise can be cancelled quite effectively to have an excellent electrical balance.

According to the present invention, a magnetic thin film plated wire memory comprises a fixed plate having a number of grooves or tunnels intersecting at right angles substantially with a number of embedded word wires whose surfaces are exposed at the intersecting point with said grooves or tunnels, and a number of digit wires arranged in said grooves or tunnels, each pair of said digit wires being a magnetic thin film plated wire and a non-magnetic conductive wire. In this structure, packing density of memory elements can be made higher comparing with that of the memory of the conventional prior art wherein a plated wire and non-magnetic conductive wire are arranged alternately. Loops of sense circuits can be made small and external noise is not easily induced. A relative position and coupling capacitance of a plated wire and a non-magnetic conductive wire are equal respectively, and in read-out operation capacitance noise from a word wire induces equally to the plated wire and to the non-magnetic conductive wire respectively. Therefore application of a differential amplifier for a sense amplifier makes noise cancellation more effective.

A fixed plate is preferably made of magnetic material such as soft ferrite with high permeability which improves magnetic effects of driving current. This structure also provides that inductance between a plated wire and a non-magnetic conductive wire becomes nearly equal, and that a digit current distributes equally to the plated wire and the non-magnetic conductive wire and reduces digit noise in write-in operation.

A digit wire consisting of a plated wire and a non-magnetic conductive wire can preferably be integrally formed to improve working efficiency and electrical effects.

Concerning the connection between digit wires in adjacent memory planes, a plated wire of one memory plane is connected with a non-magnetic conductive wire of another memory plane. In the connecting construction as this, each of two conductive wires forming a digit wire has a plated wire and a non-magnetic conductive wire. This construction as described above makes electrical loads both of the plated wire and the non-magnetic conductive wire nearly equal to each other, from the point of view of electrical balance.

Preferably, a non-magnetic returning wire is provided in the vicinity of the digit wire of a plated wire and a non-magnetic conductive wire, so that information write-in current through a digit wire and a returning wire is opposite in direction to each other. This structure helps to lower an impedance especially in those cases in which a magnetic keeper is used as a fixed plate. Forming the three wires described above into an integral body also keeps impedance constant and this structure is quite useful and favorable for a large capacity thin film plated wire memory. Moreover, the structure of outgoing and returning information write-in currents helps external magnetization cancel each other with less interaction of magnetic flux to other memory elements. Therefore a thin film plated wire memory is obtained with high packing density and stable storing of information.

The aforementioned and other objects and features of the present invention will be apparent from the following detailed description of specific embodiments thereof, when read in confunction with the accompanying drawings, in which:

FIG. 1 shows, in perspective, one embodiment of a magnetic thin film plated wire memory according to the present invention, FIG. 2 shows, in perspective, another embodiment of the present invention wherein two fixed plates are used, FIGS. 3(*a*) and 3(*b*) show output voltage wave forms of a conventional prior art magnetic thin film plated wire memory and of the present invention, respectively, FIGS. 4(*a*) and 4(*b*) are perspective views showing schematically other embodiments of the present invention, wherein a wire for flowing an electric current opposite to that of the digit wire is provided, FIGS. 5(*a*), 5(*b*), 5(*c*) and 5(*d*) are sectional views partially showing an assembled magnetic thin film plated wire memories according to other embodiments, wherein a plated wire, a non-magnetic conductive wire and a return wire are arranged mutually parallel.

Referring now to the first embodiment of the present invention shown in FIG. 1, numeral 10 shows a ferrite sheet keeper made of mixture of hard ferrite powder and thermosetting synthetic resin. A number of word wires 11 are embedded in said ferrite sheet keeper 10 in parallel. The ferrite sheet keeper 10 has a number of parallel grooves 12 substantially intersecting at right angles with the word wires 11, and the surface 13 of said word wire 11 is partially disposed at the bottom surface of said parallel grooves. Each of digit wires 16 consists of a plated wire 14 and a non-magnetic conductive wire 15 disposed in each of the parallel grooves 12 respectively. In this first embodiment of the present invention, one end of each plated wire 14 and non-magnetic conductive wire 15 is connected with a digit driver 17 by way of a short-circuit, and the other end thereof is connected with an input terminal of a sense amplifier 19. Current from the digit driver 17 flows in parallel through the plated wire 14 and the non-magnetic conductive wire 15 by way of a resistor 18, and said current leads to the parallel termination through resistors 21,22 and to an transformer 20. The word wire 11 is connected with a word driver 23. The plated wires 14 and non-magnetic conductive wires 15 are alternately arranged in the same magnetic keeper 10.

Connection between a digit wire of one memory and another digit wire of another adjacent memory, as shown in FIG. 2, is such that the plated wire 14 of the first memory 24 is connected in series with the non-magnetic conductive wire 15' of the second memory 24' and the non-magnetic conductive wire 15 of the first memory 24 is connected with the plated wire 14' of the second memory 24' respectively.

Connection of digit wires in series as described above can be accomplished by direct-facing the ends of the plated wire and non-magnetic conductive wire, or by indirect connection as using an electro-conductive wire such as a copper wire or an alloy as copper-gold wire, or as using a relay terminal.

Outstanding effects and an advantage to digit current by series connection of digit wires as described above are apparent from the output wave forms thereof shown in FIG. 3. A digit current wave form of conventional prior art magnetic thin film plated wire memory is shown in FIG. 3(*a*), wherein digit noise is depicted as numeral 25 and a digit current wave form according to the present invention is shown in FIG. 3(*b*), wherein digit noise is depicted as numeral 25'. As shown in FIGS. 3(*a*), and 3(*b*), as digit noise of the present invention is given rise equally to both of the two digit wires, application of a differential sense amplifier for the sense amplifier 19 enables noise cancellation further more effective. An additional advantage can be obtained according to the present invention that capacitance noise in driving operation can be cancelled effectively, as well as full cancellation of digit noise aforementioned, as shown in FIGS. 3(*a*) and 3(*b*) comparing numeral 26 with numeral 26'.

In an embodiment shown in FIGS. 4(*a*) and 4(*b*), the digit wire consisting of the plated conductive wire 15 and non-magnetic conductive wire 14 connected to be a short circuit at one end opposite to the sense amplifier 19. A returning wire 30 formed of non-magnetic wire is also connected in series at said one end to said both wires 14 and 15. A digit driver 17 is connected at the other end of the returning wire 30, so that the information write-in current flows from the digit driver through the returning wire 30, outgoing wire (digit wire) 14,15 and the sense amplifier 19, and is grounded.

Intersected at right angles with the digit wire 14, 15, is a word wire 11 which is driven by a word driver 23, thereby forming memory points at intersections of the word wire and the digit wire.

In the embodiment shown in FIG. 4(*b*), the digit driver 17 is connected to the sense amplifier 19 through resistors 21 and 22. Transformers 25 and 26 are employed to cancel the noise in this embodiment.

In such structures shown in FIGS. 4(*a*) and 4(*b*), the information write-in current flows in the opposite directions through the outgoing digit wire (14, 15) and the returning wire 30, so that the impedance therein is remarkably reduced.

Referring to the connection among a plated wire, a non-magnetic conductive wire, a current returning wire and groove structure of a magnetic keeper, several alternatives will be made as shown in FIG. 5(*a*), 5(*b*), 5(*c*), and 5(*d*).

FIG. 5(*a*) shows an example wherein the three wires 14, 15, 30, mentioned above are insulated respectively and bundled in a body which is set in the parallel grooves 12 through which the word wire 11 is partially exposed.

FIG. 5(*b*) shown an example wherein the returning wires 30 are embedded in the insulating sheet 31, said sheet 31 is laminated and mounted on the magnetic keeper 10 so that the returning wire 30 are in parallel to the plated wires 15 and non-magnetic conductive wires 14.

FIG. 5(*c*) shows an example wherein parallel returning wires 30 are formed on the bottom surface of the insulating sheet 31 in adjacent to the digit wires 14, 15 by print circuit technique such as photo etching technique, and said insulating sheet 31 is mounted on the magnetic keeper 10. Bent and extended word wire 11 is embedded in the second magnetic keeper 32 as shown in the Figure and mounted on said insulating sheet 31.

In another embodiment shown in FIG. 5(*d*), parallel returning wires 30 are formed on the top surface of the insulating sheet 31 and directly above said digit wires 14, 15 in the same manner as mentioned with reference to FIG. 5(*c*).

Though the present invention has been described with reference to the preferred embodiments thereof, many modifications and alternations may be made within the spirit of the present invention.

What is claimed is:

1. A magnetic thin film plated wire memory comprising a fixed plate having a number of grooves or tunnels intersecting at right angles substantially with a number of embedded word wires whose surfaces are exposed at the intersecting points with said grooves or tunnels, and a number of digit wire means arranged in said grooves or tunnels, each of said digit wire means comprising a magnetic thin film plated wire and a non-magnetic conductive wire, each of said grooves or tunnels holding at least two wires through which an electric current flows in the same direction.

2. A magnetic thin film plated wire memory as claimed in claim 1, wherein said fixed plate is made of hard ferrite having high permeability.

3. A magnetic thin film plated wire memory as claimed in claim 1, wherein said plated conductive wire and said non-magnetic conductive wire are connected at their one ends to a sense amplifier and at their other ends with each other to form a short circuit; and a returning wire is connected in series to said other ends of said conductive wires to flow an electric current in the opposite direction with respect to said digit wire.

4. A magnetic thin film plated wire memory as claimed in claimed in claim 3, wherein a digit driver is connected to said returning wire at one end opposite to said other ends of said conductive wires.

5. A magnetic thin film plated wire memory as claimed in claim 3, wherein a digit driver is connected with said sense amplifier through resistors and said returning wire is grounded at one end opposite to said other ends of said conductive wires.

6. A magnetic thin film plated wire memory as claimed in claim 3, wherein said digit wire consisting of plated conductive wire and non-magnetic conductive wire is integrally bundled together with said returning wire with electrical insulation therebetween.

7. A magnetic thin film plated wire memory as claimed in claim 3, wherein said returning wires are embedded in an insulating sheet which is laminated and mounted on said fixed plate, said returning wires being parallel to said plated wires and said non-magnetic conductive wires.

8. A magnetic thin film plated wire memory as claimed in claim 3, wherein parallel returning wires are formed on the bottom surface of an insulating sheet in adjacent to said digit wires, said insulating sheet being laminated and mounted upon said fixed plate; said word wires are bent and embedded in another magnetic fixed plate laminated upon said insulating sheet.

9. A magnetic thin film plated wire memory as claimed in claim 3, wherein parallel returning wires are formed on the top surface of an insulating sheet laminated upon said fixed plate, said returning wires being directly above said digit wires; said word wires are bent and embedded in another magnetic fixed plate laminated upon said insulating sheet.

10. A magnetic thin film plated wire memory comprising, at least, adjacent two fixed plates each having a number of grooves or tunnels intersecting at right angles substantially with a number of embedded word wires of which surface being exposed at the intersecting points with said grooves or tunnels, and a number of digit wires arranged in said grooves or tunnels, each of said digit wires comprising a magnetic thin film plated wire and a non-magnetic conductive wire, said magnetic thin film plated wires in one fixed plate being connected with said non-magnetic conductive wires in the adjacent fixed plate, said non-magnetic conductive wires in said one fixed plate being connected with said plated wires in said adjacent fixed plate.

* * * * *

PO-1050
(5/69)

UNITED STATES PATENT OFFICE
CERTIFICATE OF CORRECTION

Patent No. 3,745,541 Dated July 10, 1973

Inventor(s) Seihin Kobayashi et al

It is certified that error appears in the above-identified patent and that said Letters Patent are hereby corrected as shown below:

Column 1, line 25 - "driver" (first occurrence) should be -- word --

Signed and sealed this 20th day of November 1973.

(SEAL)
Attest:

EDWARD M.FLETCHER,JR.
Attesting Officer

RENE D. TEGTMEYER
Acting Commissioner of Patents